(12) United States Patent
Aubrun et al.

(10) Patent No.: US 11,753,169 B2
(45) Date of Patent: Sep. 12, 2023

(54) AIRCRAFT SEAT

(71) Applicant: SAFRAN ELECTRONICS & DEFENSE ACTUATION, Auxerre (FR)

(72) Inventors: Julien Aubrun, Cergy (FR); Miguel Piris, La Houssaye en Brie (FR); Olivier Gueroult, Argenteuil (FR); Emmanuel Berdah, Aubervillers (FR); Joffrey Delong, Paris (FR)

(73) Assignee: SAFRAN ELECTRONICS & DEFENSE ACTUATION, Auxerre (FR)

( * ) Notice: Subject to any disclaimer, the term of this patent is extended or adjusted under 35 U.S.C. 154(b) by 105 days.

(21) Appl. No.: 17/623,557

(22) PCT Filed: Jul. 2, 2020

(86) PCT No.: PCT/FR2020/051169
§ 371 (c)(1),
(2) Date: Dec. 28, 2021

(87) PCT Pub. No.: WO2021/001636
PCT Pub. Date: Jan. 7, 2021

(65) Prior Publication Data
US 2022/0250751 A1    Aug. 11, 2022

(30) Foreign Application Priority Data

Jul. 2, 2019   (FR) ........................................ 1907345

(51) Int. Cl.
*B64D 11/06*       (2006.01)
*B60N 2/90*        (2018.01)
(Continued)

(52) U.S. Cl.
CPC ............ *B64D 11/064* (2014.12); *B60N 2/938* (2018.02); *B64D 11/0643* (2014.12); *B60N 2/23* (2013.01); *F16D 3/06* (2013.01)

(58) Field of Classification Search
CPC .. B60N 2/938; B64D 11/064; B64D 11/0643; F16D 3/06
See application file for complete search history.

(56) References Cited

U.S. PATENT DOCUMENTS

2007/0145806 A1\* 6/2007 Wilder ............. B64D 11/06395
297/423.32

FOREIGN PATENT DOCUMENTS

WO    2015/104378 A2    7/2015

OTHER PUBLICATIONS

English translation of Written Opinion dated Oct. 7, 2020, issued in corresponding International Application No. PCT/FR2020/051169, filed Jul. 2, 2020, 6 pages.

(Continued)

*Primary Examiner* — David R Dunn
*Assistant Examiner* — Tania Abraham
(74) *Attorney, Agent, or Firm* — CHRISTENSEN O'CONNOR JOHNSON KINDNESS PLLC

(57) ABSTRACT

An aircraft seat includes an actuator and a movement transmission device. The transmission device includes a frame provided with an immobilizing portion and a drive shaft. The transmission device further includes a gear wheel provided with coupling teeth having inclined side walls and a sleeve with an immobilizing portion complementary to the immobilizing portion of the frame, and coupling teeth having inclined side walls. The transmission device also has an elastic member configured to push the sleeve. The stiffness of the elastic member and the inclination of the side walls of the coupling teeth of the gear wheel and sleeve are chosen (Continued)

such that, when a torque greater than a threshold torque is applied to the gear wheel, the sleeve slides on the drive shaft from a position of coupling the sleeve to the gear wheel to a position of immobilizing the sleeve relative to the frame.

9 Claims, 5 Drawing Sheets

(51) Int. Cl.
*B60N 2/23* (2006.01)
*F16D 3/06* (2006.01)

(56) References Cited

OTHER PUBLICATIONS

International Preliminary Report on Patentability dated Dec. 28, 2021, issued in corresponding International Application No. PCT/FR2020/051169, filed Jul. 2, 2020, 6 pages.
International Search Report dated Oct. 7, 2020, issued in corresponding International Application No. PCT/FR2020/051169, filed Jul. 2, 2020, 5 pages.
Written Opinion dated Oct. 7, 2020, issued in corresponding International Application No. PCT/FR2020/051169, filed Jul. 2, 2020, 5 pages.

* cited by examiner

AIRCRAFT SEAT

This disclosure relates to the field of seats for aircraft.

In an aircraft, the seats as well as parts of the seats can be moved or rotated by drive systems. These drive systems are, for example, suitable for pivoting the seat backrest relative to the seating portion or for moving the seat relative to the ground. The drive systems include an actuator and a transmission chain. The mechanical parts of these drive systems must be able to withstand loads corresponding to a sudden stop situation (generally called a crash) without the mechanical parts breaking and injuring a passenger. During a sudden stop situation, the seat must therefore withstand thrusts of 9 to 16 g. These mechanical parts must also be able to withstand sudden, significant, and repeated loads, for example undergone when the aircraft regains lift after passing through an air pocket or when an obese person drops violently onto the seat. Faced with these situations, the mechanical parts of the transmission chain must not break or wear prematurely, in order to reduce the number of stops on the ground for maintenance purposes.

To achieve this goal, the mechanical parts of aircraft drive systems are overengineered. However, this overengineering increases both the cost of manufacturing the mechanical parts and the weight of the aircraft. It is desirable to reduce the weight of the aircraft in order to reduce the amount of kerosene required to complete a given route, and thus reduce the cost of the air transport and protect the environment.

The invention improves the situation.

The invention relates to an aircraft seat comprising at least one actuator capable of generating movement and at least one movement transmission device comprising:
  a support;
  a frame that is fixed relative to the support, said frame being provided with an immobilizing portion,
  a drive shaft suitable for being driven by the actuator to rotate about an axis of rotation,
  a gear wheel provided with coupling teeth having inclined side walls, said gear wheel being able to rotate freely relative to the drive shaft;
  a sleeve slidably mounted on the drive shaft and integral in rotation with the drive shaft, the sleeve comprising a complementary immobilizing portion suitable for coupling with the immobilizing portion of the frame as well as coupling teeth having inclined side walls suitable for coupling with the coupling teeth of the gear wheel;
  an elastic member capable of pushing the sleeve along an axial direction towards the gear wheel in order to couple the sleeve to the gear wheel; the elastic member having a stiffness; the stiffness of the elastic member and the inclination of the side walls of the gear wheel's coupling teeth and of the sleeve's coupling teeth being chosen such that, when a torque greater than a threshold torque is applied to the gear wheel, the sleeve slides on the drive shaft from a driving position in which the sleeve is coupled to the gear wheel, to an immobilizing position in which the immobilizing portion of the frame is coupled to the complementary immobilizing portion of the sleeve.

The aircraft seat according to the invention comprises a transmission device which makes it possible to counteract an excessively large force so that the actuator and the mechanical parts of the transmission system do not need to withstand this force. The force is taken up via a dedicated path of operation and avoids having to overengineer the normal path of operation.

Advantageously, the transmission device is a purely mechanical system which does not need external energy to be provided. It has no need for a control and execution system in order to work. The transmission device is inserted into any rotary transmission system and does not interfere with its operation. By virtue of its immobilization control function as well as its adaptability, the transmission device of the aircraft seat avoids having to overengineer the actuator and the mechanical parts of the transmission system and ultimately reduces the weight and/or lowers the technical requirements of the main transmission function.

The features set forth in the following paragraphs may optionally be implemented. They may be implemented independently of each other or in combination with each other:
  the side walls of the coupling teeth of the sleeve form an angle of between 8° and 30° relative to the axis of rotation, and the elastic member has a stiffness of between 2 daN/mm and 15 daN/mm,
  the immobilizing portion comprises grooves extending over a first circular arc and the complementary immobilizing portion comprises projections extending over a second circular arc, the second circular arc being smaller than the first circular arc,
  the height of the coupling teeth of the gear wheel and/or the height of the coupling teeth of the sleeve is greater than the height of the projections of the immobilizing portion and/or than the height of the projections of the complementary immobilizing portion,
  a first end of the frame comprises a counterbore, and the sleeve comprises a housing arranged facing the counterbore of the frame; the elastic member is arranged around the drive shaft and housed partly in the counterbore of the sleeve and partly in the housing of the sleeve,
  the internal face of the sleeve and the external face of the drive shaft comprises a slide connection extending along the direction of the axis of rotation,
  one among the internal face of the sleeve and the external face of the drive shaft comprises a groove extending along the direction of the axis of rotation, and the other comprises a recess and a pin that is housed in the recess and able to slide in the groove,
  wherein the transmission device comprises a first stop arranged on the drive shaft, a second stop arranged on the drive shaft at a predefined distance from the first stop, and wherein the gear wheel, the sleeve, the elastic member, and the frame are fitted onto the drive shaft between the first stop and the second stop.

BRIEF DESCRIPTION OF DRAWINGS

Other features, details, and advantages will become apparent upon reading the detailed description below, and upon analyzing the accompanying drawings, in which.

DESCRIPTION OF EMBODIMENTS

For the most part, the drawings and the description below contain elements that are definite in nature. Therefore not only can they serve to provide a better understanding of this disclosure, but they also contribute to its definition, where appropriate.

Figure 1:
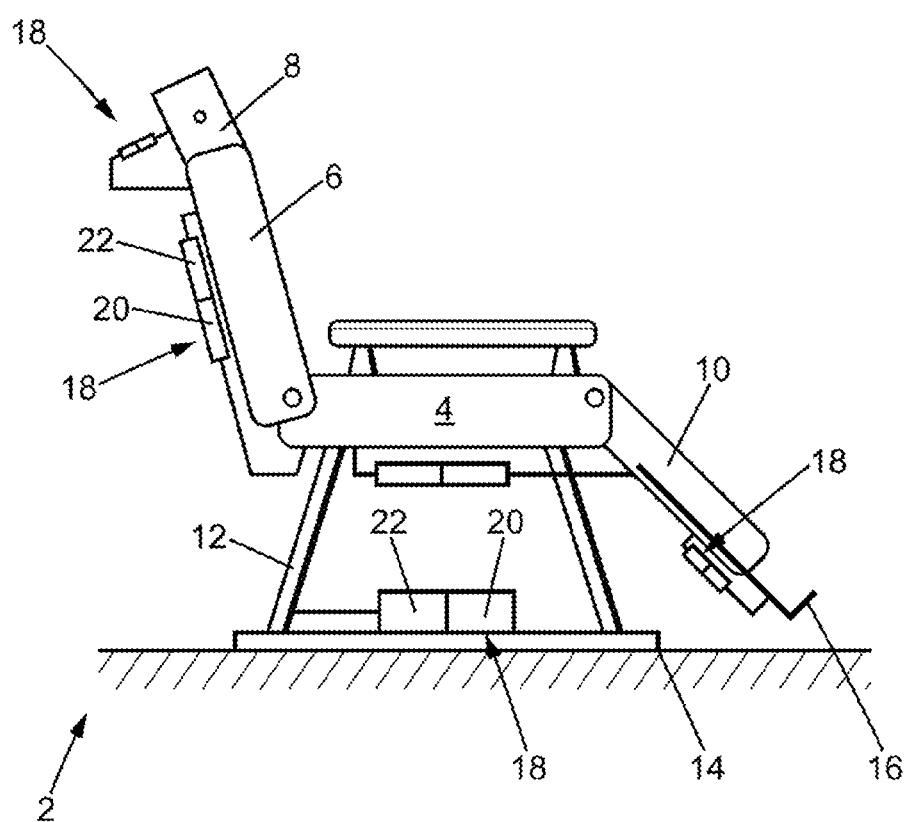
FIG. 1 is a schematic side view of an aircraft seat according to the invention.

Referring to FIG. 1, an example of an aircraft seat 2 according to the invention is shown. It comprises a seating portion 4, a backrest 6 mounted to pivot relative to the seating portion 4, a headrest 8 mounted to pivot relative to the backrest 6, a legrest 10, feet 12, and slides 14 fixed to the ground. The feet 12 of the seat are suitable for sliding in the slides 14 in order to move the seat 2 forward or backward. The seat 2 may also include a passenger footrest 16 suitable for sliding relative to the legrest 10 between a retracted position and a deployed position.

The seat 2 comprises one or more electric drive systems 18 dedicated to pivoting each of these hinges and to moving the seat 2 and the passenger footrest 16. Each drive system 18 comprises a rotary or linear actuator 20 and a transmission system 22 for transmitting the movement generated by the actuator to the seat element to be moved.

The transmission system 22 comprises mechanical parts suitable for transmitting the movement generated by the actuator 20 to a movable element of the seat. These mechanical parts comprise, for example, gears, connecting rods, a rack, etc.

Figure 2:
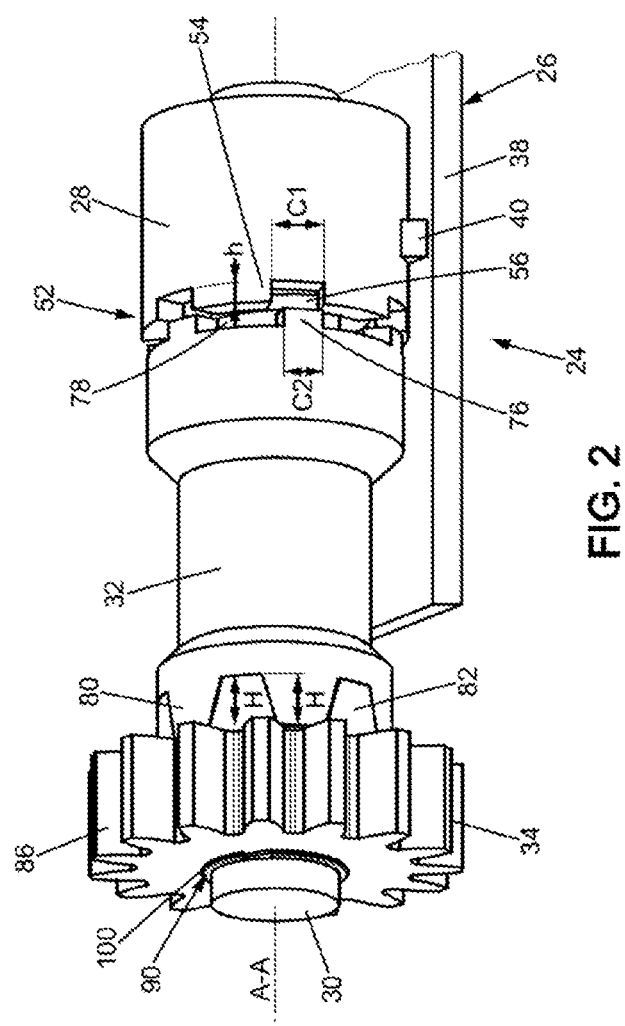
FIG. 2 is a perspective side view of a transmission device of the aircraft seat according to the invention.
Figure 3:
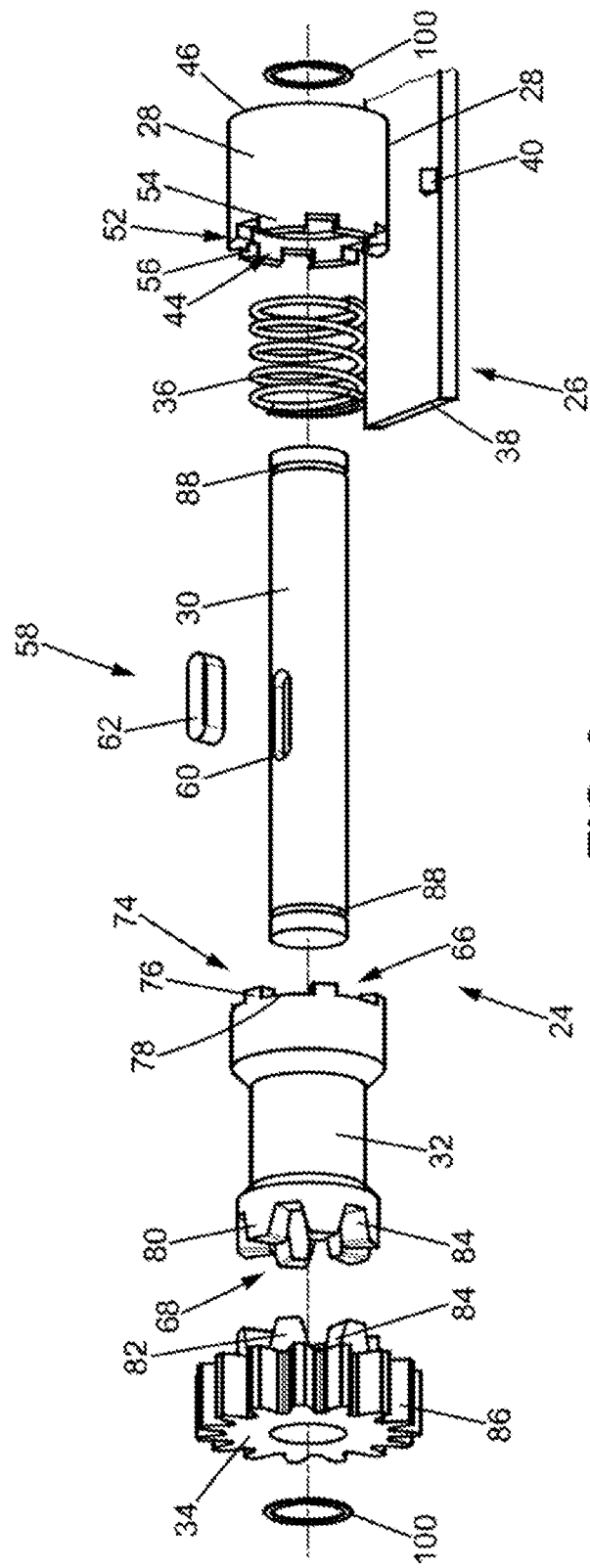
FIG. 3 is an exploded perspective view of the transmission device illustrated in FIG. 2.

The transmission system 22 also comprises a transmission device 24 shown in particular in FIGS. 2 and 3. This transmission device 24 comprises a support 26, a frame 28 fixed to the support 26, and a drive shaft 30 having a longitudinal axis forming an axis of rotation A-A. This transmission device 24 further comprises a sleeve 32, an output gear wheel 34, and an elastic member 36 that is arranged around the drive shaft 30.

The support 26 is, for example, composed of a plate 38 and a jaw 40 integral with the plate 38.

Figure 4:
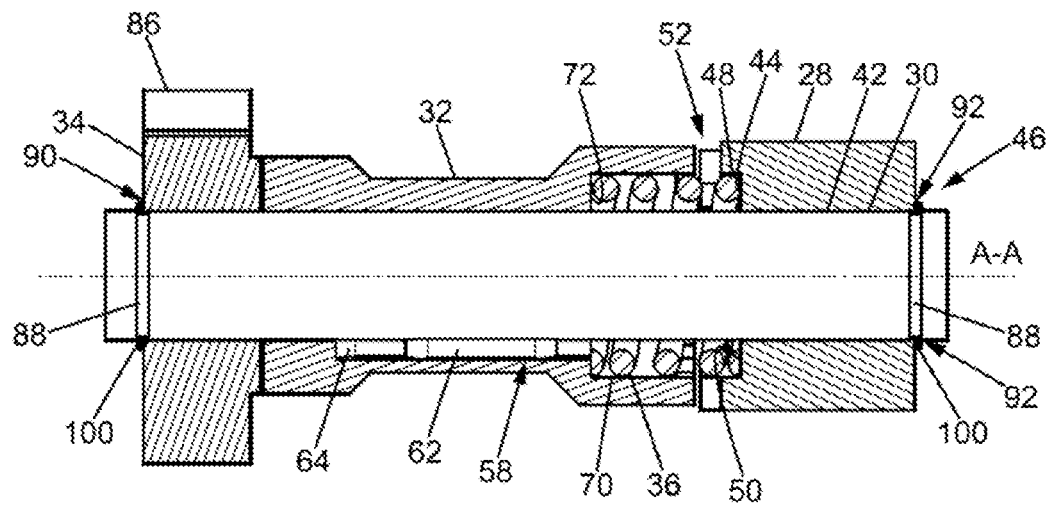
FIG. 4 is an axial section view of part of the transmission device illustrated in FIG. 2, when the transmission device is in a driving position.
Figure 5:
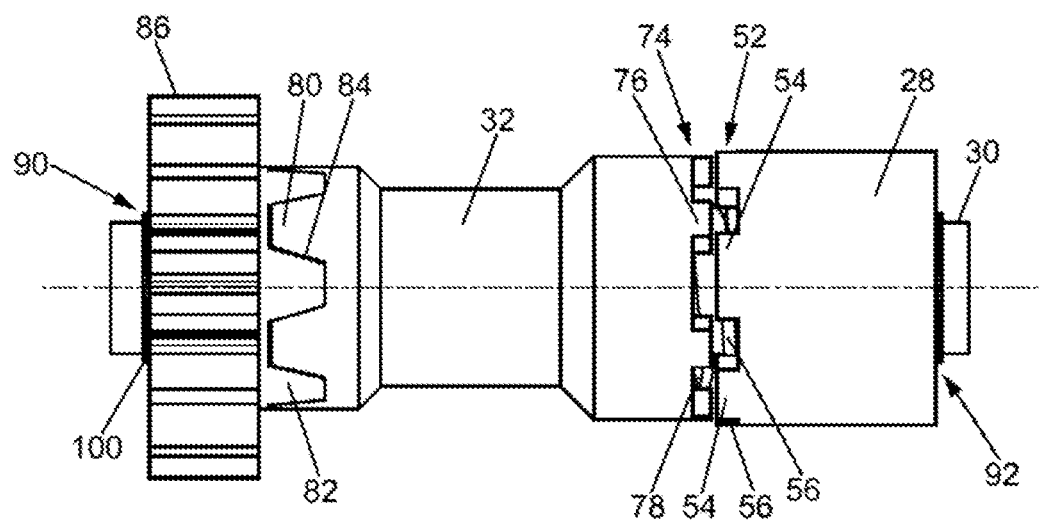
FIG. 5 is a side view of the part of the transmission device illustrated in FIG. 4.

The frame 28 is fixed to the plate 38 by means of the jaw 40. In the example shown, the frame 28 has the shape of a cylinder of revolution. Referring to FIGS. 4 and 5, the frame 28 is provided with a bore 42 having a diameter substantially equal to the diameter of the drive shaft 30 plus a clearance. The bore 42 extends for example around the central axis of the cylinder of revolution. The frame 28 has a first end face 44 located facing the sleeve 32 and a second end face 46 opposite to the first end face. The first end face 44 comprises a counterbore 48 suitable for receiving a part of the elastic member 36. The bottom annular wall of the counterbore constitutes a support face 50 for one end of the elastic member 36.

The first end face 44 is also provided with an immobilizing portion 52 of an immobilization device for locking the rotation of the sleeve 32 relative to the frame 28. In the embodiment shown, the immobilization device is a temporarily inactive clutch-type coupling. The immobilizing portion 52 is composed of alternating projections 54 and grooves 56 extending around the tubular edge of the first end face 44 of the frame. The projections 54 have a crenellated shape. The grooves 56 arranged between two projections 54 extend over a circular arc C1, illustrated in FIG. 2.

The drive shaft 30 is mounted to rotate freely within the bore 42 of the frame. The drive shaft 30 is suitable for being driven to rotate about the axis of rotation A-A by a mechanical part of the transmission system or by the actuator.

Figure 6:
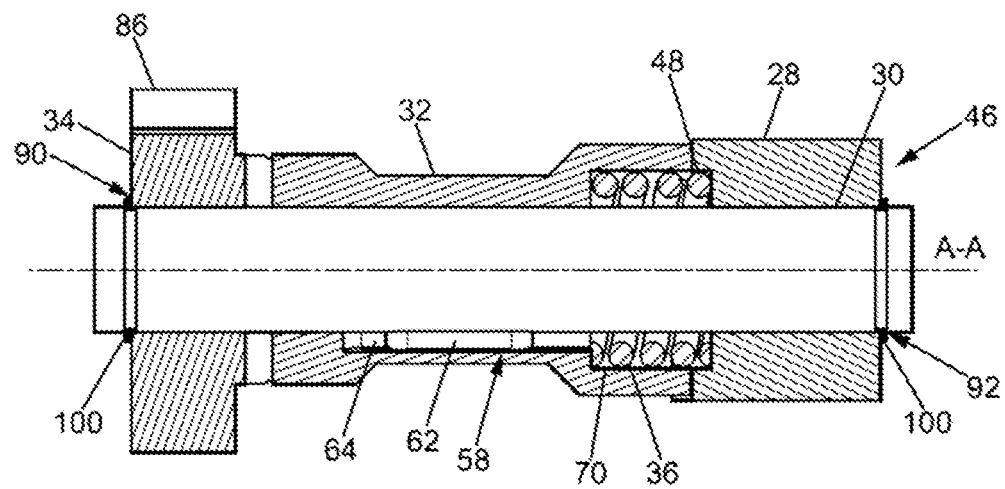
FIG. 6 is an axial section view of part of the transmission device illustrated in FIG. 2, when the transmission device is in an immobilized position.
Figure 7:
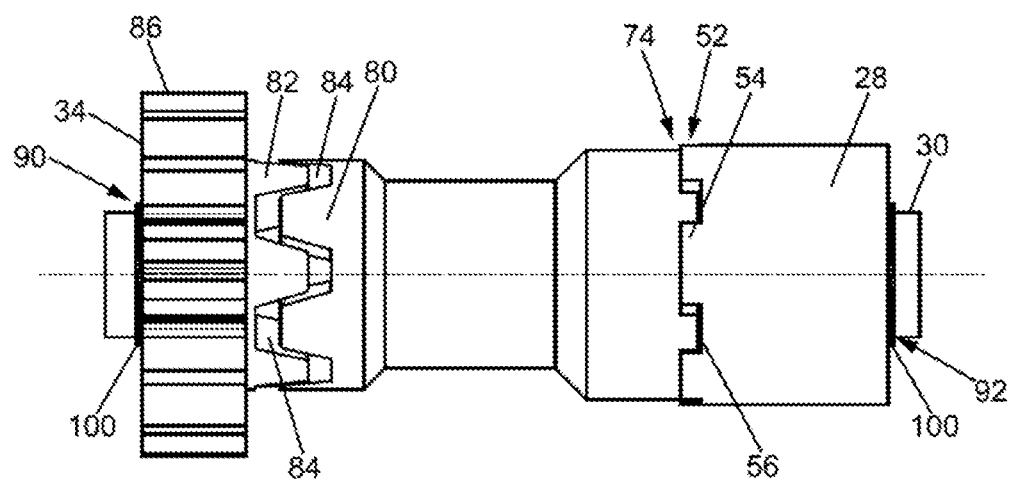
FIG. 7 is a side view of the part of the transmission device illustrated in FIG. 6.

The sleeve 32 is slidably mounted around the drive shaft 30. It forms a sliding shuttle capable of moving between a position of driving the output gear wheel 34, shown in FIGS. 4 and 5, and a position of locking or immobilizing the output gear wheel 34, shown in FIGS. 6 and 7.

The sleeve 32 is integral in rotation with the drive shaft 30. For this purpose, a slide connection 58 is formed between the sleeve 32 and the drive shaft 30. This slide connection 58 extends along the direction of the axis of rotation A-A, as shown in FIGS. 3 and 4. In the embodiment shown, this slide connection 58 comprises a recess 60 created on the outer cylindrical face of the drive shaft 30 and a pin 62 housed in the recess as well as a groove 64 arranged on the inner face of the sleeve 32. This groove 64 extends longitudinally along the direction of the axis of rotation A-A.

Referring to FIGS. 3 and 4, the sleeve 32 has a first end face 66 arranged facing the frame 28 and a second end face 68 arranged facing the output gear wheel 34.

The first end face 66 comprises a circular and central housing 70 suitable for receiving a part of the elastic member 36. The annular bottom of this housing forms a support face 72 for the elastic member. The support face 50 of the frame and the support face 72 of the sleeve are perpendicular to the axis of rotation A-A.

The elastic member 36 is fitted around the drive shaft 30. It is suitable for acting between the frame 28 and the sleeve 32. In particular, in the embodiment shown, the elastic member 36 bears against the support face 50 of the frame and against the support face 72 of the sleeve. It is arranged partly in the counterbore 48 of the frame and partly in the housing 70 of the sleeve. The elastic member 36 is suitable for pushing the sleeve 32 along an axial direction towards the output gear wheel 34. The elastic member 36 has a stiffness of between 2 daN/mm and 15 daN/mm.

In the embodiment shown, the elastic member 36 is a compression spring. Alternatively, the elastic member 36 may be composed of one or more spring washers of the Belleville type or of the wave spring type also known as Smalley washers.

Referring to FIG. 5, the first end face 66 of the sleeve is also provided with a complementary immobilizing portion 74 of the immobilization device intended to cooperate with the immobilizing portion 52. The complementary immobilizing portion 74 of the immobilization device is also composed of alternating projections 76 and grooves 78 extending around the tubular edge of the first end face 66 of the sleeve. The projections 76 have a crenellated shape and extend along a circular arc C2 illustrated in FIG. 2. Advantageously, in the embodiment shown, circular arc C2 is smaller than circular arc C1, to facilitate the coupling of the complementary portion 74 with the immobilizing portion 52.

The second end face 68 of the sleeve is provided with coupling teeth 80 extending axially. These coupling teeth 80 are suitable for coupling with coupling teeth 82 extending axially from the output gear wheel 34. The coupling teeth 80 of the sleeve and the coupling teeth 82 of the output gear wheel form a dog clutch type of coupling.

The coupling teeth 80 of the sleeve and the coupling teeth 82 of the output gear wheel have side walls 84 inclined relative to the axis of rotation A-A so that the coupling teeth 80 of the sleeve are able to rub and slide against the coupling teeth 82 of the output gear wheel, when a predefined torque is applied to the output gear wheel. Thus, as can be seen in the figures, the coupling teeth 80 of the sleeve and the coupling teeth 82 of the output gear wheel have a generally triangular shape. Advantageously, the side walls 84 form an angle α of between 8° and 30° relative to the axis of rotation A-A.

Advantageously, the inclination of the side walls 84 of the coupling teeth 80, 82, the stiffness of the elastic member 36, and the friction of the slide connection 68 can be adapted so that the transmission device 24 blocks the transmission of movement from the moment a selected threshold torque is reached in order to protect the actuator 20 and the mechanical parts of the transmission system 22 in the event of a sudden impact. The transmission device is a mechanical immobilization system which allows immobilizing the rotary system at a desired torque by mechanical control of the immobilization.

Preferably, the height H of the coupling teeth 80 of the sleeve and the height H of the coupling teeth 82 of the output gear wheel is greater than the height h of the projections 54 of the frame and the height h of the projections 76 of the sleeve so that the coupling teeth 80 of the sleeve always remain in engagement with the coupling teeth 82 of the output gear wheel. Thus, the immobilization device can once again drive the output gear wheel 34 after an immobilization of the transmission device, without the intervention of a technician.

The output gear wheel 34 is mounted to rotate freely about the drive shaft 30. Conventionally, it comprises the coupling teeth 82 extending axially, and gear teeth 86 extending radially and suitable for coupling with a rack, gear wheel, or other part of the transmission system 22.

The transmission device 24 has a first stop 90 and a second stop 92 which are arranged on the drive shaft. The second stop 92 is positioned at a predefined distance from the first stop 90. This predefined distance is substantially greater than the sum of the width of the gear wheel, the width of the sleeve 32, and the width of the frame 28.

In the embodiment shown, the first 90 and the second 92 stops each have a circular peripheral groove 88 and a stop ring 100 suitable for being embedded in a peripheral groove 88 in order to lock the axial movement of the frame 28, sleeve 32, and output gear wheel 34. Alternatively, the first 90 and second 92 stops are for example composed of a circlip or a shoulder on the drive shaft 30.

Alternatively, the projections 54 and grooves 56 of the immobilizing portion 52 and the projections 76 and grooves 78 of the complementary immobilizing portion 74 are replaced by an annular friction surface. In this variant, rotation of the sleeve 32 is blocked by friction of a tubular portion of the sleeve against a tubular portion of the frame.

During operation, in the passive state, the transmission device 24 is in a driving position. In this position, the elastic member 36 presses the sleeve 32 towards the output gear wheel 34 as shown in FIGS. 4 and 5. The coupling teeth 80 of the sleeve are coupled with the coupling teeth 82 of the output gear wheel. When a passenger wishes to move or rotate a movable member of the seat, he or she controls the actuator 20 so that it causes the drive shaft 30 to rotate about the axis of rotation A-A. The drive shaft 30 rotates the sleeve 32. The sleeve 32 pivots the output gear wheel 34 by means of the coupling of the coupling teeth 80 of the sleeve with the coupling teeth 82 of the output gear wheel. The movement generated by the actuator 20 is transmitted to the output gear wheel 34.

When large torque is applied to the output gear wheel 34, for example during a sudden stop, the transmission device 24 automatically places itself in an immobilized position. Indeed, the torque transmitted by the output gear wheel 34 via the effect from the inclination of the side faces 84 of the coupling teeth 80, 82 of the sleeve and of the gear wheel overcomes the force provided by the elastic member 36 to press the sleeve 32 against the output gear wheel 34. The sleeve 32 then moves axially towards the frame 28. The immobilizing portion 74 of the sleeve couples with the immobilizing portion 52 of the frame. As the frame 28 is fixed, the sleeve 32 is rotationally immobilized relative to the frame.

This disclosure is not limited to the exemplary embodiment described above solely as an example, but encompasses all variants conceivable to a person skilled in the art within the context of the protection being sought.

The invention claimed is:

1. An aircraft seat comprising at least one actuator configured to generate movement and at least one movement transmission device, the transmission device comprising:
   a support;
   a frame that is fixed relative to the support, said frame being provided with an immobilizing portion,
   a drive shaft driven by the actuator to rotate about an axis of rotation,
   a gear wheel provided with coupling teeth having inclined side walls, said gear wheel being freely rotatable relative to the drive shaft;
   a sleeve slidably mounted on the drive shaft and integral in rotation with the drive shaft, the sleeve comprising a complementary immobilizing portion configured to couple with the immobilizing portion of the frame as well as coupling teeth having inclined side walls configured to couple with the coupling teeth of the gear wheel; and
   an elastic member configured to push the sleeve along an axial direction towards the gear wheel to couple the sleeve to the gear wheel; the elastic member having a stiffness; the stiffness of the elastic member and the inclination of the side walls of the coupling teeth of the gear wheel and of the coupling teeth of the sleeve being chosen such that, when a torque greater than a threshold torque is applied to the gear wheel, the sleeve slides on the drive shaft from a driving position in which the sleeve is coupled to the gear wheel, to an immobilizing position in which the immobilizing portion of the frame is coupled to the complementary immobilizing portion of the sleeve.

2. The aircraft seat according to claim 1, wherein the side walls of the coupling teeth of the sleeve form an angle of between 8° and 30° relative to the axis of rotation, and wherein the elastic member has a stiffness of between 2 daN/mm and 15 daN/mm.

3. The aircraft seat according to claim 1, wherein the immobilizing portion comprises grooves extending over a first circular arc, and wherein the complementary immobilizing portion comprises projections extending over a second circular arc, the second circular arc being smaller than the first circular arc.

4. The aircraft seat according to claim 3, wherein a height of the coupling teeth of the gear wheel and/or a height of the coupling teeth of the sleeve is greater than a height of the projections of the immobilizing portion and/or a height of the projections of the complementary immobilizing portion.

5. The aircraft seat according to claim 1, wherein a first end of the frame comprises a counterbore, and wherein the sleeve comprises a housing arranged facing the counterbore of the frame; and wherein the elastic member is arranged around the drive shaft and housed partly in the counterbore of the sleeve and partly in the housing of the sleeve.

6. The aircraft seat according to claim 1, wherein an internal face of the sleeve and an external face of the drive shaft comprise a slide connection extending along the direction of the axis of rotation.

7. The aircraft seat according to claim 6, wherein one of the internal face of the sleeve and the external face of the drive shaft comprises a groove extending along the direction of the axis of rotation, and the other comprises a recess and a pin that is housed in the recess and configured to slide in the groove.

8. The aircraft seat according to claim 1, wherein the transmission device comprises a first stop arranged on the drive shaft, and a second stop arranged on the drive shaft at a predefined distance from the first stop, wherein the gear wheel, the sleeve, the elastic member, and the frame are fitted onto the drive shaft between the first stop and the second stop.

9. The aircraft seat according to claim 8, wherein the first stop comprises a peripheral groove formed on the outer face of the drive shaft, and a stop ring embedded in the peripheral groove.

\* \* \* \* \*